(12) United States Patent
Wieneke

(10) Patent No.: US 9,644,948 B2
(45) Date of Patent: May 9, 2017

(54) METHOD FOR THE CONTACT-FREE MEASUREMENT OF DEFORMATIONS OF A SURFACE OF A MEASURED OBJECT

(75) Inventor: Bernhard Wieneke, Goettingen (DE)

(73) Assignee: LAVISION GMBH, Goettingen (DE)

( * ) Notice: Subject to any disclaimer, the term of this patent is extended or adjusted under 35 U.S.C. 154(b) by 1880 days.

(21) Appl. No.: 12/668,462

(22) PCT Filed: Jul. 1, 2008

(86) PCT No.: PCT/EP2008/005366
§ 371 (c)(1),
(2), (4) Date: Jan. 11, 2010

(87) PCT Pub. No.: WO2009/018881
PCT Pub. Date: Feb. 12, 2009

(65) Prior Publication Data
US 2010/0183191 A1    Jul. 22, 2010

(30) Foreign Application Priority Data
Aug. 9, 2007 (DE) .......................... 10 2007 037 726

(51) Int. Cl.
*G06K 9/00* (2006.01)
*G01B 11/16* (2006.01)

(52) U.S. Cl.
CPC .................................. *G01B 11/16* (2013.01)

(58) Field of Classification Search
None
See application file for complete search history.

(56) References Cited

U.S. PATENT DOCUMENTS

| 4,139,302 A * | 2/1979 | Hung | G01B 11/161 356/32 |
| 4,653,104 A * | 3/1987 | Tamura | G06T 7/0057 356/610 |
| 5,699,159 A * | 12/1997 | Mason | G01L 3/12 356/35.5 |
| 5,867,250 A * | 2/1999 | Baron | A61B 3/107 351/211 |
| 6,208,769 B1 * | 3/2001 | Pankratov | G06K 9/6203 382/300 |
| 6,628,845 B1 * | 9/2003 | Stone | G06K 9/6203 382/280 |

(Continued)

FOREIGN PATENT DOCUMENTS

EP   1816854 A1   8/2007
WO   2004038328 A2   5/2004

*Primary Examiner* — Tsung-Yin Tsai
(74) *Attorney, Agent, or Firm* — Gerald E. Hespos; Michael J. Porco; Matthew T. Hespos

(57) ABSTRACT

The invention relates to a method for the contact-free measurement of deformations of a surface of a object in which a series of individual images is captured in each of two time windows (T1, T2), wherein between every two individual image captures the image detector is displaced relative to the object and parallel to its detector surface by an optical offset of the size of a fraction of a pixel up to a few pixels, the individual images of the first time window (T1) are processed in pairs with the individual images of the second time window (T2) to produce a set of individual deformation fields (18) and an average of the individual deformation fields (18) is calculated as an output deformation field (20).

10 Claims, 3 Drawing Sheets

(56) References Cited

U.S. PATENT DOCUMENTS

Figure 1:
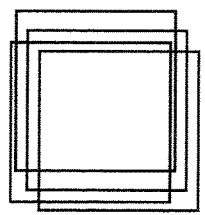

| | | | |
|---|---|---|---|
| 7,155,052 B2* | 12/2006 | Geshel | G06T 7/0006 348/124 |
| 7,763,875 B2* | 7/2010 | Romanov | G01D 5/2495 250/208.1 |
| 2003/0228050 A1* | 12/2003 | Geshel | G06T 7/0006 382/149 |
| 2006/0115133 A1 | 6/2006 | Potter et al. | |
| 2007/0051884 A1* | 3/2007 | Romanov | G01D 5/2495 250/231.13 |
| 2007/0260419 A1* | 11/2007 | Hagiwara | G03F 7/70358 702/150 |
| 2007/0296829 A1 | 12/2007 | Nakamura | |
| 2009/0028404 A1* | 1/2009 | Bussadori | A61B 8/08 382/130 |
| 2009/0124901 A1* | 5/2009 | Fink | A61B 8/0825 600/437 |
| 2009/0324040 A1* | 12/2009 | Lindop | G01S 7/52042 382/131 |
| 2010/0214406 A1* | 8/2010 | Potapenko | C03B 17/064 348/135 |
| 2011/0299738 A1* | 12/2011 | Wieneke | G01P 5/001 382/107 |

* cited by examiner

METHOD FOR THE CONTACT-FREE MEASUREMENT OF DEFORMATIONS OF A SURFACE OF A MEASURED OBJECT

The invention relates to as method for the contact-free measurement of deformations of a surface of an object wherein, using an image detector composed of a plurality of arranged pixels, in a first time window where a first mechanical stress is applied to the object, at least one first image of the object is captured, and in a second time window where a second mechanical stress is applied to the object, at least one second image of the object is captured, and the captured images are processed together by a data processing unit to produce a deformation field which assigns to areas of the object deformation values representing stress-induced deformations.

Such procedures find multiple application, for example, in the field of materials testing. Here a component to be tested, called the object, is subjected to mechanical stress. At least two images of the object are captured in two different time windows, of which, for example, one can be before and one after application of the mechanical stress or both can be temporally separate during application of the mechanical stress. An image here is understood to be an ordered data matrix where each matrix entry corresponds to the measurement result of one pixel of an image detector. CCD cameras, CID cameras or similar devices are typically used as image detectors.

Typically a comparison of the images captured in the first time window and those captured in the second time window yields a translation caused by the applied stress for every area of the surface of the object, and this translation can be different for the different areas. If one assigns to each of these areas a vector representing the translation of the respective area, one obtains a displacement vector field. Such a displacement vector field is typically used as the basis for calculating a differential strain field which represents the local strain values for each area of the object surface. The term strain here refers to its various manifestations, i.e. extension, compression, shearing, rotation, swirl, shear, etc. whose mathematically formulated definitions are known to a person skilled in the art. Since the strain values are the mathematical results of the spatial derivatives of the displacement of each surface point, the differential strain field is typically determined from the difference-vectors of adjacent displacement vectors of the displacement vector field. However, there are also methods whereby a strain field can be calculated directly, that is, without having to go through the circuitous route of calculating a displacement vector field from the images captured in the time windows. To cover both method variants, we will generally speak here of a deformation field composed of deformation values wherein the displacement values, especially displacement vectors, or the strain values are referred to as deformation values, depending on the application. Depending on the measurement or calculation method, the deformation values can be scalars, vectors or higher-order tensors.

There are several known methods for determining the displacement vector field. The so-called cross-correlation method is especially convenient. Here an image captured in the first time window is divided into a number of image cells. The image cells can, for example, be generated as a uniform grid distributed over the image geometry. It should be noted that the image cells orient themselves solely to the image geometry and not to the data content of the image. The same image cell division is effected for an image captured in the second time window. Subsequently the corresponding image cells of both images are linked by a two-dimensional cross-correlation, preferably along the X and Y designated grid axes. The maximum value of such a cross-correlation function supplies the displacement vector for the image cell and thus for the area of the object surface represented by the image cell of the first image.

The cross-correlation allows displacement vectors to be determined that are accurate down to the subpixel level. In selecting the cell size of, say, 20×20 pixels, a displacement vector accuracy of 0.01 to 0.05 pixel is feasible using known methods. Further accuracy improvement can be attained by enlarging the cells. However, this increases the distance between the individual vectors of the displacement vector field so that in some cases a choice between the accuracy of the individual vectors and the resolution of the vector field will have to be made. In many cases, however, improving the accuracy of calculation of the displacement vectors, retaining a high resolution of the vector field, is desirable. Known methods reach their limits here.

The same also applies to cases where another way of processing the individual images into a deformation field is chosen, for example, methods that lead directly to an strain field.

There are various known methods from the field of digital photography for improving the quality of individual images. In the simplest case, several images of the same object are captured and averaged with each other. In particular, this can reduce detector noise.

Real resolution improvement can be attained by targeted "blurring". In this process a plurality of individual images are captured where the detector is displaced marginally relative to the object between the individual captures. The displacement occurs preferably by an offset of the order of magnitude of a fraction of a pixel, up to a few pixels, but a displacement by a integral multiple of a pixel does not meet the objective. The detector is displaced vertically to the optical axis, that is, parallel to the detector surface. This is to be understood in the present application as meaning that the displacement must feature at least one component parallel to the detector surface; an (additional) minor displacement parallel to the optical axis is harmless. Using known deconvolution methods one can then calculate an output image with subpixel resolution from the captured image series and the information about the displacement. However, since the deconvolution algorithm is sensitive to noise, one can attain usually only one resolution improvement by a factor of 2 to 4 using this method.

The above-described method for calculating a displacement vector field would therefore benefit only marginally from the application of targeted "blurring" to the images of the first and of the second time window that are to be processed together.

The task of the present invention is to improve a generic method to such an extent that the accuracy with which the deformation sizes are determined is increased while retaining the resolution of the deformation field.

This task is solved together with the features of the preamble of claim 1 in that a plurality of individual images are captured in temporal sequence in each of the time windows, wherein between every two individual image captures the image detector is offset relative to the object and parallel to its detector surface by an optical offset of a size ranging from a fraction of a pixel up to a few pixels, the individual images of the first time window are processed pairwise with the individual images of the second time window to produce a set of individual deformation fields and an average of the individual deformation fields is calculated to yield an output deformation field.

Thus instead of using targeted "blurring" and subsequent deconvolution to process resolution-improved images with each other from the first time window and the second time window, for example, by means of cross-correlation, the invention proposes capturing several individual images in each time window, as in the case of targeted "blurring", but processing them directly and in pairs with each other. This results in a plurality of individual deformation fields which are then averaged with each other to determine the output deformation field. Separate deconvolution is thus not carried out. It should be noted that the concept of "averaging" is broadly understood here and, apart from the arithmetic average, also includes more complex forms of averaging such as regression.

This approach appears surprising at first since neither the convolution of data connected with the "blurring" nor the cross-correlation typically used to process pairs of individual images are linear functions from which one would expect a quality improvement through averaging. Nevertheless, it has been shown that with the method described in the invention the accuracy of the calculation of deformation values of the output deformation field can be improved by a factor of 10, all the while retaining the image cell size, i.e., the resolution of the output deformation field. In relation to the above-mentioned example of an image cell selection of 20×20 pixels this means that, for example, displacement vectors with an accuracy of up to 0.001 pixel can be determined. Usually only the differential strain values derived herefrom are of interest, but they can likewise be calculated with significantly better accuracy. This represents a significant quality improvement over the known method.

The deformation field is preferably a displacement vector field which assigns stress-induced translations to the areas of the object. As mentioned above, the pairwise processing of individual images of the first and of the second time window advantageously takes place as an image-cell-based, two-dimensional cross-correlation of the respective image data. The method according to the invention, however, is not limited to cross-correlation as the processing method for the individual images.

A displacement vector determined according to the invention, as is basically known from the state of the art, can serve as the basis for producing a strain field which assigns to the areas of the object strain values representing stress-induced strain of these areas. For this purpose, differences between neighbouring displacement values and/or quantities derived from such differences are calculated. In particular, from the differences between individual vector components and the corresponding vector components of various neighbouring vectors it is possible to determine strain tensors from whose components one can calculate scalar strain values. In the continuous case the tensor components could be $$\varepsilon_{xx} = \partial \Delta x/\partial x, \varepsilon_{xy} = \partial \Delta x/\partial y, \varepsilon_{yx} = \partial \Delta y/\partial x, \varepsilon_{yy} = \partial \Delta y/\partial y,$$

where $\Delta x$ or $\Delta y$ signifies a difference between the x or y component of the displacement vector, respectively, and $$\partial/\partial x \text{ or } \partial/\partial y$$

denotes the partial derivation in the x or y direction, respectively. The strain values of the actual expansion and shearing, which are usually of most interest, are defined as $\varepsilon_{xx}+\varepsilon_{yy}$ or $\frac{1}{2}(\varepsilon_{xy}+\varepsilon_{yx})$. In the discrete (because digital) present case, corresponding differences or difference-quotients can be used instead of the differentials.

As an alternative to calculating the strain field—that is usually of interest—by means of the interim calculation of the displacement vector field, in another embodiment of the invention provision is made for the deformation field to be a strain field which assigns to the areas of the object strain values representing stress-induced strain of these areas. In other words, the pairwise processing of images from the two time windows can also lead directly to a strain field, often accompanied by the simultaneous calculation of the displacement vector field.

As should be apparent to a person skilled in the art, it is necessary that the offset of the image detector relative to the object between captures of the individual images should be optical in nature, i.e. it must relate to an offset of the image of the object projected onto the image detector relative to the detector surface. This can, for example, be done via mechanical displacement of the image detector itself, for example using electromechanical and/or piezoelectric actuators. However, it is also alternatively possible to produce the optical offset by varying an optical medium between the detector and the object.

Provision is made here for the optical offsets of the image detector to occur preferably between captures of the individual images of one time window modulo a pixel expansion uniformly distributed over a pixel surface. In other words this means that the displacements, which preferably but not necessarily are respectively smaller than the expansion of one pixel in the displacement direction, are distributed as uniformly as possible in the synoptic view. In particular, a one-component vibration of the image detector would lead to an undesirable accumulation of the offsets obtained on a line oriented in the vibration direction. "Uniformly distributed" must be understood here in the statistical sense and means evenly distributed within the standard deviation. As already mentioned above, the amount of offset depends only on the fraction of a pixel expansion that exceeds a whole multiple, including zero. This is expressed mathematically by the "modulo" formulation.

A significant advantage of the method according to the invention over such "blurring" methods that require a deconvolution step is that no precise information about the actual optical displacements of the detector between captures of the individual images is necessary. The fact that this information is unnecessary gives rise to the other advantage, namely that the optical displacement can be of any, especially random or pseudo-random, kind. Thus, for example, actuators that mechanically displace the image detector could be randomly activated or, in the case of optical offset through variation of the optical medium between the detector and the object, a rotating wedge plate or a similar simple device, for example, could be used. In this regard it is advantageous that frequently occurring vibrations of the object or of the measurement layout are not harmful to the accuracy of the method as they would be, for example, in the case of other strain measuring procedures based on interferometric methods.

The object is advantageously static during each time window. For optimal measurement this means that the object is subjected during the first time window to a first mechanical stress that does not lead to any dynamic change in the object, for example, caused by flowing of the material. This first mechanical stress can, for example, be zero. The second time window is advantageously positioned so that the object is likewise in a static state but is subjected to a second mechanical stress that is different from the first mechanical stress. However, such advantageous preconditions are not always feasible. It is, for example, possible for one of the applied mechanical stresses, especially the second mechanical stress, to be so great during the second time window that the object changes dynamically during the time window. It is further possible for the object to change dynamically during both time windows, in which case, for example, the same mechanical stress exceeding a material yield point of the object material is applied during both time windows. In other words, this means that the first and second mechanical stress can be equal and the object continuously deforms under the applied stress.

In all these situations it can be advantageous to calculate compensation for this global displacement or deformation of the object during one or both time windows in order to obtain a corresponding correction of the displacement vector field. For this purpose, in a favourable further embodiment of the invention it is proposed that, to calculate the output deformation field from the individual deformation fields, a regression should be determined via a histogram which represents the deformation values of the individual deformation fields assigned to one area of the object over the time of capture of the individual images of one time window. In concrete terms this means that the individual displacement vector fields calculated through the respective pairwise processing, especially by cross-correlation, of two individual images from different time windows are arranged by image cell in a histogram which plots the size (and, if applicable, the direction) of each displacement vector of the individual displacement vector fields over the time of capture of the individual images belonging to the time window in need of compensation. If, for example, 10 individual images of the first time window at constant strain are correlated with 10 individual images of the second time window with variable strain, 100 individual displacement vector fields are the result. For every image cell one histogram can then be created on whose X-axis, for example, the capture times of the individual images of the second time window are plotted, i.e. the axis is divided into 10 segments. In each of these 10 segments 10 histogram points represent the sizes (plotted on the Y-axis) of the individual displacement vectors which result from the correlations with the 10 individual images of the first time window. If one draws a (in the simplest case, linear) regression through this histogram, this represents the global displacement or deformation of the object during the second time window. The regression in itself is seen here as an average and a value representing the regression, such as the value of the regression curve at a mean point in time of the time window T2, can be used as an output size for the affected image cell.

Even though for reasons of clarity the foregoing invention was essentially described for the purely two-dimensional case, the method according to the invention is not limited to this. Instead, it is possible to calculate the corresponding values or vector fields also on three-dimensionally extending surfaces. At least two image detectors, spatially apart from each other, are used for this purpose. Their output data are combined in a manner obvious to a person skilled in the art, given the above explanations.

More features of the invention are evident from the following specific description and the drawings.

Figure 2:
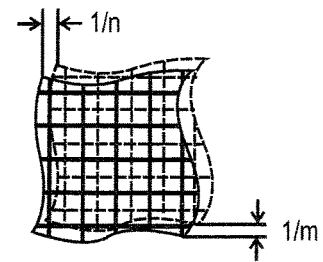
Figure 3:
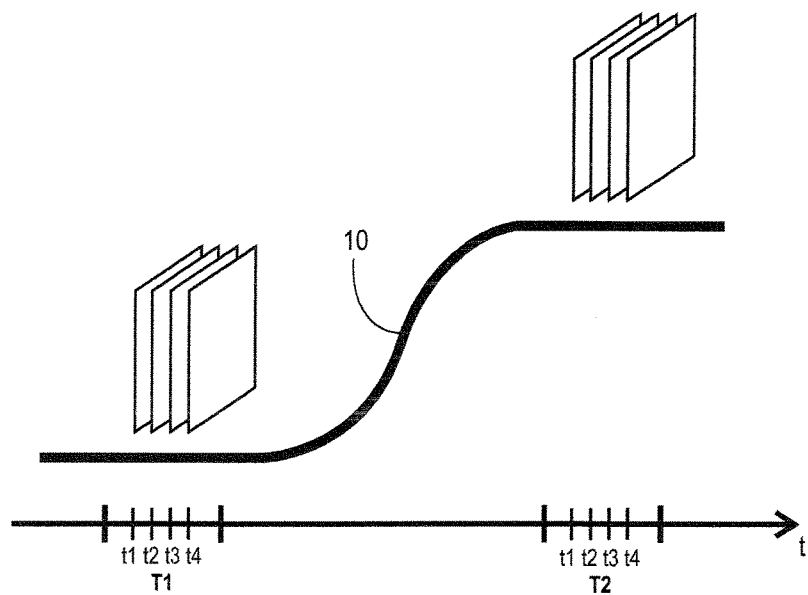
Figure 4:
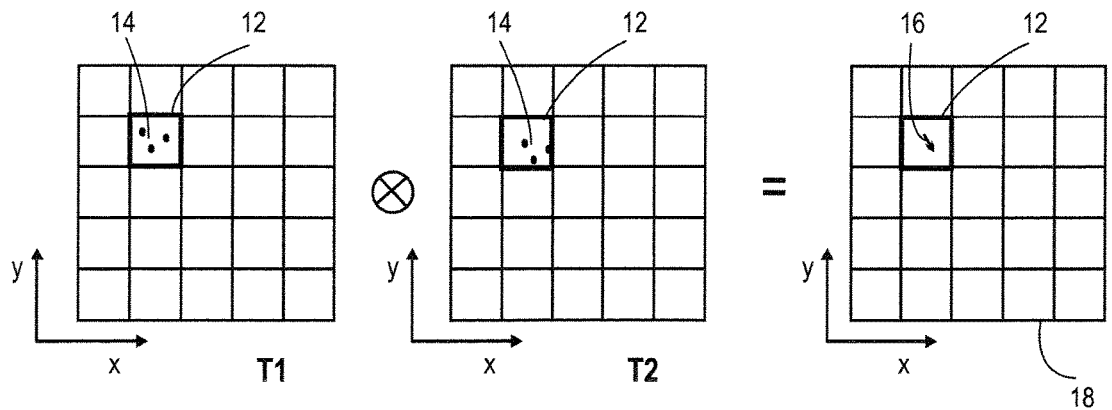
Figure 5:
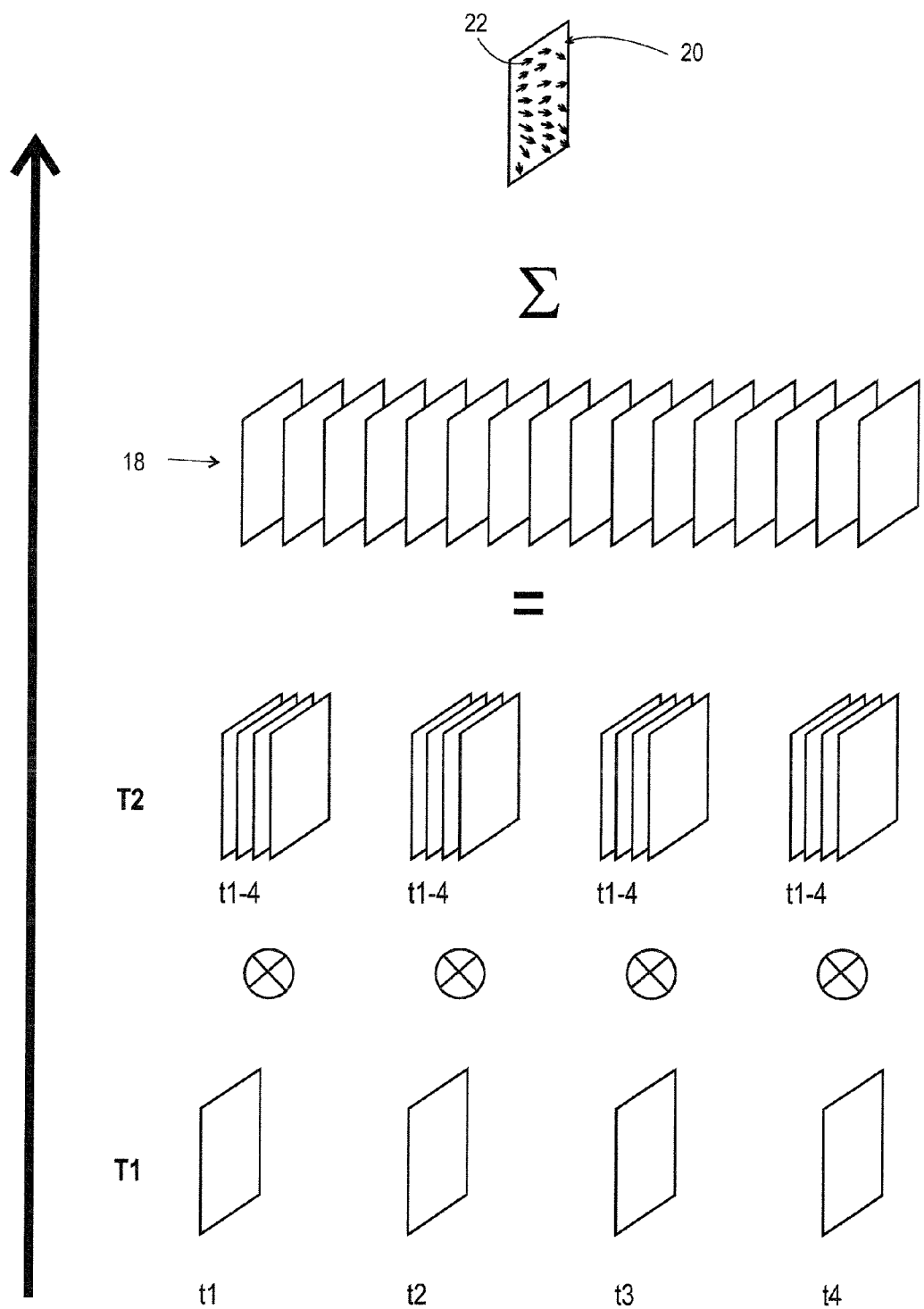
Figure 6:
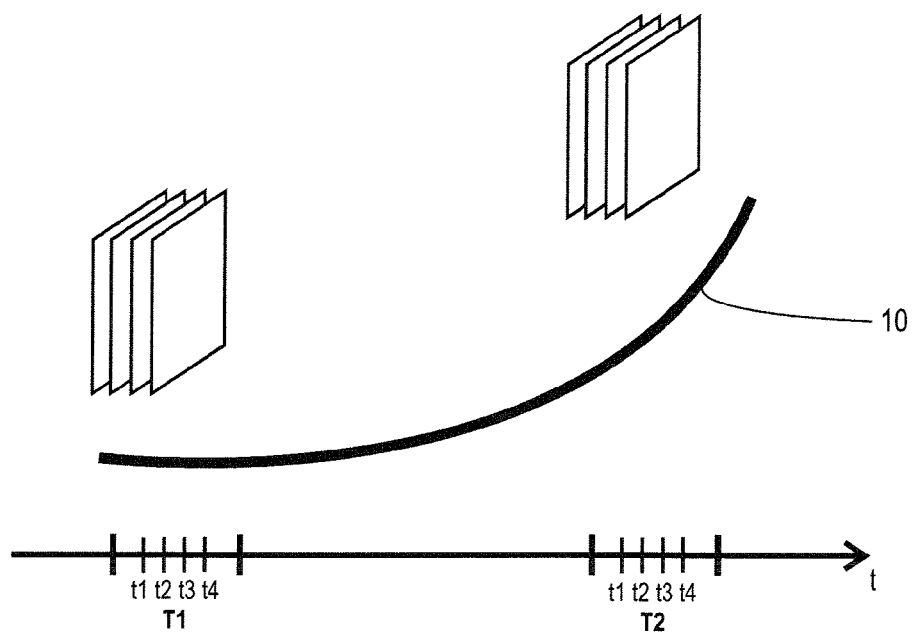
Figure 7:
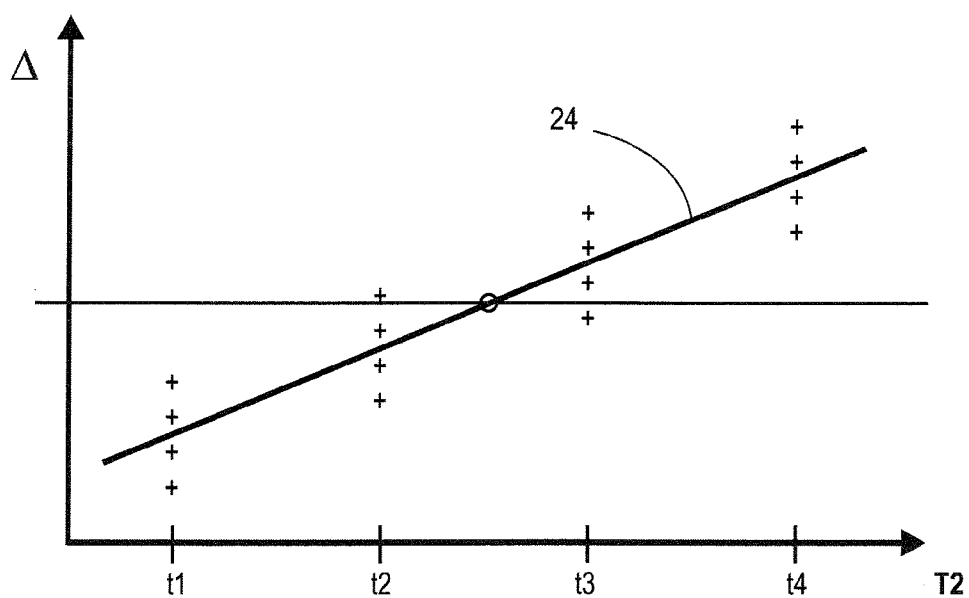

They show:

FIG. 1: a schematic diagram of several individual images, displaced relative to each other, FIG. 2: a schematic diagram of one segment of two individual images from FIG. 1 to demonstrate the preferred offset size, FIG. 3: a schematic diagram of the individual images captured in two time windows in relation to the deformation of the object, FIG. 4: a schematic diagram of the calculation of an individual displacement vector field from two individual images, FIG. 5: a schematic diagram of the generation according to the invention of an output displacement vector field, FIG. 6: the diagram from FIG. 3 with another progression of deformation of the object, and FIG. 7: a schematic diagram of a compensation calculation method, especially to be used in the measuring situation depicted in FIG. 6.

As was already explained in detail in the general part of the description, it is a significant feature of the invention that the individual images captured during each time window are optically offset relative to each other. FIG. 1 shows schematically four individual images offset against each other in this way. As shown in FIG. 1, the detector, for example, a CCD camera or its chip, can be displaced by controllable actuators between the individual captures. On the other hand, it is also possible, for the optical displacement, to use variations of an optical medium to displace the image of the object on the detector.

FIG. 2 shows schematically the preferred order of magnitude of the offset. Advantageously this is only a fraction of a detector pixel, e.g. ½, ⅓, ¼, etc. Displacement by more than a pixel is also basically possible but preferably it should not exceed a few pixels. An offset by an integral multiple of a pixel is basically harmless but it does not contribute to improved resolution. In the synoptic view the offsets of one time window (in each case modulo one pixel expansion) should be distributed uniformly over a pixel surface.

FIG. 3 shows schematically the typical progress of a measurement according to the method described in the invention. Curve 10 shows schematically the progression of a global deformation of the object due to an applied mechanical stress. In the especially favorable case depicted in FIG. 3, the object goes from a first static state to a second static state due to the application of the mechanical stress. Time window T1 and T2 are defined during these static states. During these time windows a plurality of individual images is captured with the above-explained optical offset against each other. In the embodiment depicted in FIG. 3, an individual image is captured in each time window at times t1, t2, t3 and t4 so that in each case 4 individual images result from each time window.

FIG. 4 shows schematically the generation of a displacement vector field from two images that come from different time windows. In FIG. 4 the images are labeled with the abbreviation of the corresponding time window T1 or T2. Each image is divided into a plurality of image cells 12 which are respectively oriented to the geometry of the image and not to the image information acquired in the image. A typical division into image cells is the division of the entire image into adjacent blocks of, in each case, for example 20×20 pixels. In FIG. 4 a pattern 14 consisting of three dots is drawn as image information in the marked image cell 12. These dots represent surface points on the object. At this point it should be indicated that it is possible but not absolutely necessary to cover the surface of the object with a defined pattern of marking points. Differences in contrast that result from the natural surface structure of the object are often sufficient, especially when employing the cross-correlation method.

Cell-by-cell comparison of images T1 and T2 with each other, especially through a two-dimensional, spatial cross-correlation of the image axes, which are designated in FIG. 4 with x and y, yields a local displacement vector 16 for every image cell 12. The depiction of all displacement vectors 16 in the image cells 12 assigned to them yields the sought-after displacement vector field 18. For visualization purposes a depiction of the object can be superimposed on the vector field 18. A false color depiction of the object, as a function of the values of the displacement vectors 16 is also a customary visualization measure The cross-correlation method depicted in FIG. 4 is basically known in the state of the art. FIG. 5 shows schematically the improvement of the known method according to the invention. Each image t1, t2, t3 and t4 captured in time window T1 is linked, especially cross-correlated, here with each image t1-t4 captured in time window T2 and this results in a plurality of individual displacement vector fields 18. Since FIG. 5, with recourse to FIG. 3, assumes that in each case 4 individual images were captured in each time window T1, T2, the depicted example yields 16 individual displacement vector fields 18. An average of these individual vector fields 18 yields an output displacement vector field 20 which has a significantly better accuracy of the local displacement vectors 22 while retaining image cell size.

FIG. 6 shows, in the same diagram as FIG. 3, the case wherein the object is not in a stationary state, at least in the second time window T2. This means that a global deformation or displacement is superimposed on the deliberately introduced displacement of the individual images. To compensate for this global deformation or displacement, a correction of the individual displacement vector fields precedes the calculation of the output displacement vector field, or the conventional averaging (e.g. formation of an arithmetic mean) is replaced by a more complex type of averaging such as regression.

An especially advantageous method for calculating a suitable correction size is depicted in FIG. 7. For this purpose a histogram is generated for each image cell 12, as shown in FIG. 7. The entries of the histogram correspond to the individual displacement vectors 16 of the corresponding image cell 12 from all individual displacement vector fields 18. The times at which the individual images t1, t2, t3 and t4 were captured during the second time window T2 are plotted on the abscissa of the histogram. The ordinate indicates the value of the respective local displacement vector 16. It should be noted that FIG. 7, for reasons of clarity, does not depict the direction of the local displacement vectors 16. In fact all information contained in the local displacement vectors 16 can be depicted in a multi-dimensional histogram. In the present case the histogram entries are depicted in 4 clusters. Whether a cluster formation or another distribution actually occurs depends in the concrete application, among other things, on whether the object is in a non-stationary state in only one or in both time windows, as well as on the relation of the optical offset of the individual images to the order of magnitude of the global displacement or deformation to be compensated. A regression 24 through the histogram, depicted in the present case as a linear regression, can serve as the basis for calculating an averaged size or serve as a compensation size. In particular, it can make sense, just like in the depicted embodiment, to choose as an averaged size that point on the regression line 24 corresponding more or less to the middle of time window T1.

The output displacement vector field created according to the invention can serve as the basis for calculating other values. In particular, a differential strain field can be calculated from the difference-vectors of neighbouring displacement vectors in the output displacement vector field.

Naturally the embodiments explained in the specific description and depicted in the diagrams are merely illustrative embodiments of this invention. In light of the disclosure made here, a person skilled in the art is given a wide variation spectrum. In particular the invention is not limited to the application of cross-correlation for the processing in pairs of individual images for the purpose of generating the individual displacement vector fields. Other methods known to the person skilled in the art can also be used especially in cases where the surface of the object is covered by a clearly defined pattern. The generalization of the method according to the invention to the depiction of three-dimensional stretched surfaces using at least two image detectors is obvious to the person skilled in the art, based on the two-dimensional case described here.

The invention claimed is:

1. A method for the contact-free measurement of deformations of a surface of an object using an image detector composed of a plurality of arranged pixels, the method comprising the steps of:
    capturing a plurality of first individual images in temporal sequence in a first time window (T1) where a first mechanical stress is applied to the object, the capturing of the plurality of first images being carried out so that, between every two first individual image captures, the image detector is offset relative to the object and parallel to a detector surface of the image detector by an optical offset of a size ranging from a fraction of a pixel up to a few pixels,
    capturing a plurality of second individual images temporal in a second time window (T2) where a second mechanical stress is applied to the object,
    the capturing of the plurality of second images being carried out so that, between every two second individual image captures, the image detector is offset relative to the object and parallel to its detector surface by an optical offset of a size ranging from a fraction of a pixel up to a few pixels,
    processing with a processing unit, the first individual images pairwise with the second individual images to produce a set of individual deformation fields (18), each of the individual deformation fields assigning local deformation values to each respective area of the object, with each local deformation value representing stress-induced local deformations calculated from one pair of the individual images and with each of the pairs of the individual images being defined by one of the first individual images and one of the second individual images, and
    calculating an average of the individual deformation fields (18) to yield an averaged output deformation field (20).

2. The method according to claim 1, wherein the deformation field is a displacement vector field which assigns to the areas of the object displacement vectors (16) representing stress-induced translations of these areas.

3. The method according to claim 2, wherein the pairwise processing of the individual images of the first and of the second time window (T1, T2) is effected as an image-cell-based, two-dimensional cross-correlation of the respective images.

4. The method according to claim 2, wherein, to generate a strain field which assigns to the areas of the object strain values representing stress-induced strain of these areas, differences between neighbouring displacement values (22) and/or quantities derived from such differences are calculated.

5. The method according to claim 1, wherein the deformation field is a strain field which assigns to the areas of the object strain values (16) representing stress-induced strain of these areas.

6. The method according to claim 1, wherein the optical offsets of the image detector between the captures of the individual images of a time window (T1; T2) occur modulo a pixel expansion and uniformly distributed over a pixel surface.

7. The method according to claim 1, wherein the optical offset of the image detector between the captures of two individual images is done using electromechanical and/or piezoelectric actuators.

8. The method according to claim 1, wherein the optical offset of the image detector between the captures of two individual images occurs through variation of an optical medium between the image detector and the object.

9. The method according to claim 1, wherein, to determine the output deformation field (20) from the individual deformation fields (18) a regression (24) is calculated through a histogram which represents the deformation quantities (16) of the individual deformation fields assigned to an area of the object over the time of capture of the individual images of a time window (T1; T2).

10. The method according to claim 1, wherein at least two image detectors spatially offset against each other are used to calculate three-dimensional deformation fields.

* * * * *